(12) United States Patent
Sato (10) Patent No.: US 10,726,089 B2
(45) Date of Patent: Jul. 28, 2020

(54) LOCATION INFORMATION OUTPUT METHOD, INFORMATION PROCESSING DEVICE, AND RECORDING MEDIUM

(71) Applicant: FUJITSU LIMITED, Kawasaki-shi, Kanagawa (JP)

(72) Inventor: Yoichi Sato, Aomori (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 15/895,678

(22) Filed: Feb. 13, 2018

(65) Prior Publication Data

US 2018/0267984 A1    Sep. 20, 2018

(30) Foreign Application Priority Data

Mar. 14, 2017 (JP) .................. 2017-049066

(51) Int. Cl.
*G06F 16/9537* (2019.01)
*G06F 16/31* (2019.01)
(Continued)

(52) U.S. Cl.
CPC .......... *G06F 16/9537* (2019.01); *G06F 16/29* (2019.01); *G06F 16/313* (2019.01); *G06F 40/10* (2020.01); *G09B 29/10* (2013.01)

(58) Field of Classification Search
CPC ............... G06F 16/313; G06F 16/9637; G06F 16/9537; G06F 16/29; G06F 40/10; G09B 29/10

See application file for complete search history.

(56) References Cited

U.S. PATENT DOCUMENTS

| 2005/0038781 A1* | 2/2005 | Ferrari | G06F 16/3344 707/999.004 |
| 2011/0078575 A1* | 3/2011 | Xiao | G06F 16/29 715/738 |

(Continued)

FOREIGN PATENT DOCUMENTS

| EP | 2209073 A1 | 7/2010 |
| JP | 2002-269118 A | 9/2002 |

(Continued)

OTHER PUBLICATIONS

Extended European Search Report dated May 14, 2018 for corresponding European Patent Application No. 18155506.1, 8 pages.

(Continued)

*Primary Examiner* — Kannan Shanmugasundaram
(74) *Attorney, Agent, or Firm* — Fujitsu Patent Center (57) ABSTRACT

A location information output method executed by a processor included in an information processing device provided with a display device, the method includes extracting a plurality of words corresponding to a noun from a web page displayed on a screen of the display device; transmitting a first word corresponding to a proper noun and a second word corresponding to a non-proper noun among the extracted plurality of words to a search system which searches location information according to a search word, the second word being transmitted when an image is detected by executing a search based on the second word; receiving a search result which is obtained according to the transmitting from the search system; and outputting location information included in the received search result from the display device as location information related to the web page.

13 Claims, 7 Drawing Sheets

(51) Int. Cl.
  *G06F 16/29* (2019.01)
  *G09B 29/10* (2006.01)
  *G06F 40/10* (2020.01)

(56) References Cited

U.S. PATENT DOCUMENTS

2013/0262537 A1* 10/2013 Srikrishna ............... G06F 16/93
                                                     707/827
2014/0006408 A1   1/2014 Rae et al.

FOREIGN PATENT DOCUMENTS

JP    2007-104464 A    4/2007
JP    2008-262383 A    10/2008

OTHER PUBLICATIONS

European Office Action dated Apr. 24, 2019 for corresponding European Patent Application No. 18155506.1, 6 pages.

* cited by examiner

| SEARCH WORD | LOCATION INFORMATION |
|---|---|
| LOCAL PRODUCT SHOPPING CENTER FOR TOURISTS XX | N xx°yy'zz"<br>E uuu°vv'ww" |
| XX CIVIC GYMNASIUM | N xx°yy'zz"<br>E uuu°vv'ww" |
| RAMEN AND LOCAL PRODUCT SHOPPING CENTER FOR TOURISTS XX | N xx°yy'zz"<br>E uuu°vv'ww" |
| ... | ... |

LOCATION INFORMATION OUTPUT METHOD, INFORMATION PROCESSING DEVICE, AND RECORDING MEDIUM

CROSS-REFERENCE TO RELATED APPLICATION

This application is based upon and claims the benefit of priority of the prior Japanese Patent Application No. 2017-49066, filed on Mar. 14, 2017, the entire contents of which are incorporated herein by reference.

FIELD

The embodiment discussed herein is related to a location information output method, an information processing device, and a recording medium.

BACKGROUND

In recent years, in a service such as a blog, a private person opens various articles in the Internet. In such articles, articles related to tourist attractions which the private person has visited at a time of trip, a local special dish, and the like, are included. There is a case in which when a user searches for information of tourist attractions at a time of planning a trip, articles of such a blog are hit. A user obtains information of tourist attractions by reading articles related to a trip in a blog; however, in many cases, location information of tourist attractions is not described in articles related to a trip in a blog.

As a search related to location information, for example, a method of searching a web page corresponding to location information of a search word, using data base in which location information and a network address of a web page are correlated in a plurality of respective words is proposed. When proposing information, for example, a method of displaying a proper noun, or information added to the proper noun is displayed by being aligned with document data, by extracting the proper noun from the document data which is being displayed is proposed. As the related art, for example, Japanese Laid-open Patent Publication No. 2002-269118, Japanese Laid-open Patent Publication No. 2007-104464, and the like, are disclosed.

However, for example, when location information of a tourist attraction is not described in articles related to a trip, a user individually searches for location information by searching the tourist attraction which appears in the articles. For this reason, when planning a trip of walking around a plurality of tourist attractions, it takes time and effort when obtaining location information of the plurality of tourist attractions. When considering the above situation, it is preferable to easily provide location information.

SUMMARY

According to an aspect of the invention, a location information output method executed by a processor included in an information processing device provided with a display device, the method includes extracting a plurality of words corresponding to a noun from a web page displayed on a screen of the display device; transmitting a first word corresponding to a proper noun and a second word corresponding to a non-proper noun among the extracted plurality of words to a search system which searches location information according to a search word, the second word being transmitted when an image is detected by executing a search based on the second word; receiving a search result which is obtained according to the transmitting from the search system; and outputting location information included in the received search result from the display device as location information related to the web page.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, a location information output program, a location information output method, and an embodiment of an information processing device which are disclosed in the application will be described in detail. The disclosed technology is not limited by the embodiment. The following embodiment may be appropriately combined without any contradiction.

Figure 1:
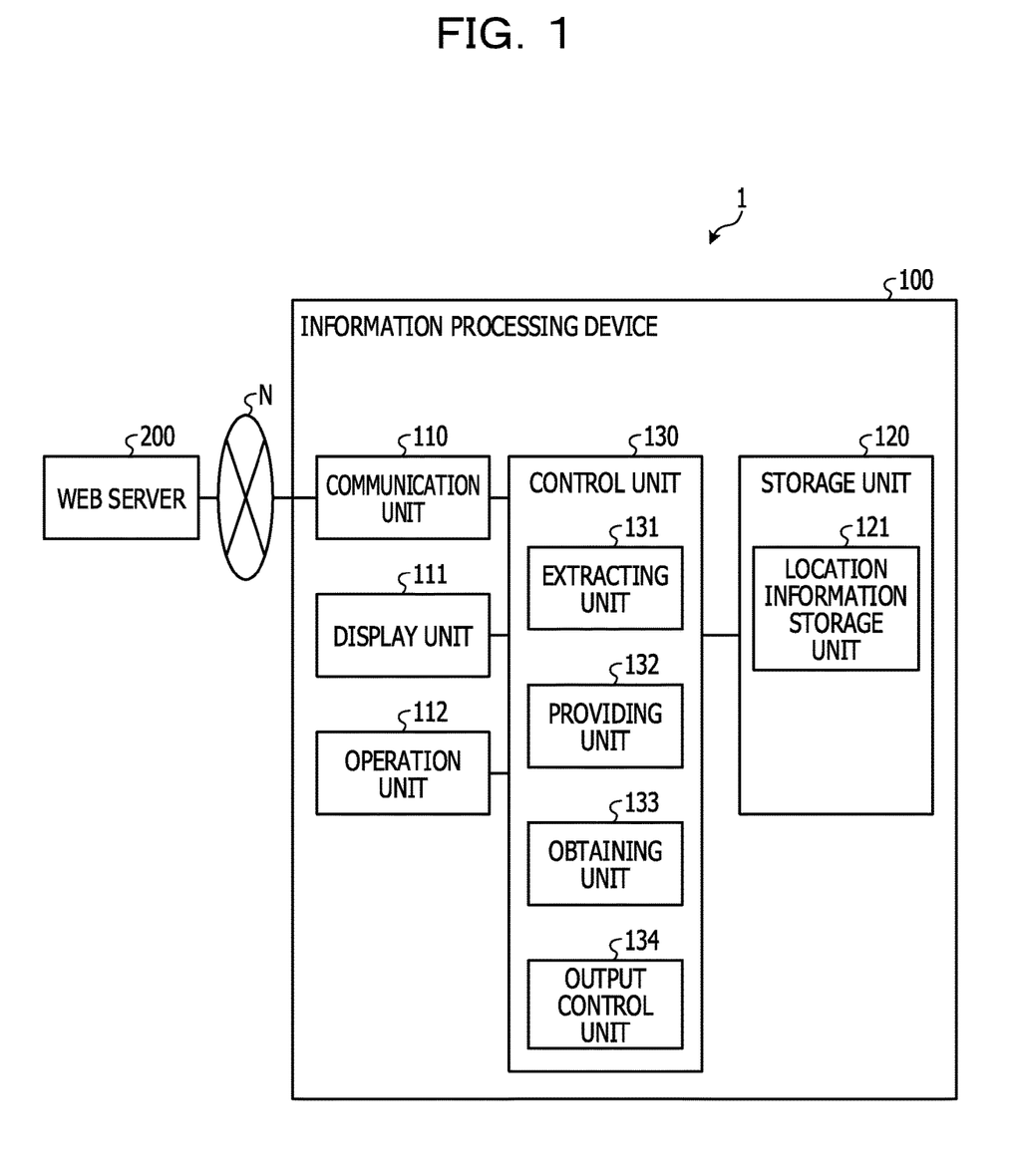
FIG. 1 is a block diagram which illustrates an example of configuration of an information processing system according to an embodiment.

FIG. 1 is a block diagram which illustrates an example of a configuration of an information processing system in the embodiment. The information processing system 1 illustrated in FIG. 1 includes an information processing device 100 and a web server 200. The number of information processing devices 100 and web servers 200 are not limited. The information processing device 100 and the web server 200 of arbitrary numbers may be included. The information processing device 100 and the web server 200 are communicably connected to each other through a network N. A communication network of arbitrary types such as a local area network (LAN), or a virtual private network (VPN), including the Internet may be adopted in the network N.

The information processing device 100 is, for example, an information processing device for a user to browse a web page provided by the web server 200. In the information processing device 100, it is possible to use a stationery, a portable personal computer, or the like, for example. A mobile-type communication terminal such as a tablet terminal or a smart phone may be used in the information processing device 100. In the information processing device 100, a user visits various web pages through a search site, or the like, for example. The information processing device 100 extracts a word corresponding to a noun from the web page based on an instruction of a user, for example. The information processing device 100 provides a word corresponding to a proper noun, and a word in which an image is detected by executing a search, even if it is a word corresponding to a non-proper noun, among extracted words, to a search system which searches location information according to a search word. The information processing device 100 obtains a search result corresponding to the provision from the search system. The information processing device 100 outputs the location information corresponding to the obtained search result as location information related to the web page. In this manner, the information processing device 100 may provide location information.

The web server 200 is, for example, an information processing device which provides a web page such as a blog. The web page such as the blog provided by the web server 200 includes, for example, articles related to a trip. The web server 200 may provide a web page of a tourism association, or the like, for example.

Subsequently, a configuration of the information processing device 100 will be described. As illustrated in FIG. 1, the information processing device 100 includes a communication unit 110, a display unit 111, an operation unit 112, a storage unit 120, and a control unit 130. The information processing device 100 may include various functional units included in a computer, which are well-known, in addition to the functional units illustrated in FIG. 1, for example, various input devices, sound output devices, or the like.

The communication unit 110 is realized by, for example, a network interface card (NIC), or the like. The communication unit 110 is a communication interface which is connected to the web server 200 through the network N in a wired or wireless manner, and is in charge of an information communication with the web server 200, The communication unit 110 transmits an extracted noun group which is input from the control unit 130 to a server (not illustrated) which extracts a proper noun. The communication unit 110 outputs the extracted proper noun group which is received from the server (not illustrated) which extracts the proper noun to the control unit 130. The communication unit 110 transmits a search word input from the control unit 130 to a search system (not illustrated). The communication unit 110 outputs a search result received from the search system (not illustrated) to the control unit 130.

The display unit 111 is a display device for displaying various information with respect to a user of the information processing device 100. The display unit 111 is realized, for example, by a liquid crystal display, or the like, as the display device. The display unit 111 displays various screens such as a display screen which is input from the control unit 130.

The operation unit 112 is an input device which receives various operations from the user of the information processing device 100, The operation unit 112 is realized by, for example, a keyboard, a mouse, or the like, as the input device. The operation unit 112 outputs an operation input by the user to the control unit 130 as operation information. The operation unit 112 may be realized by a touch panel, or the like, as the input device. The display device of the display unit 111 and the input device of the operation unit 112 may be integrated.

The storage unit 120 is realized by, for example, a semiconductor memory device such as a random access memory (RAM), and a flash memory, and a storage device such as a hard disk or an optical disk. The storage unit 120 includes a location information storage unit 121. The storage unit 120 stores information which is used in processing in the control unit 130.

Figure 2:
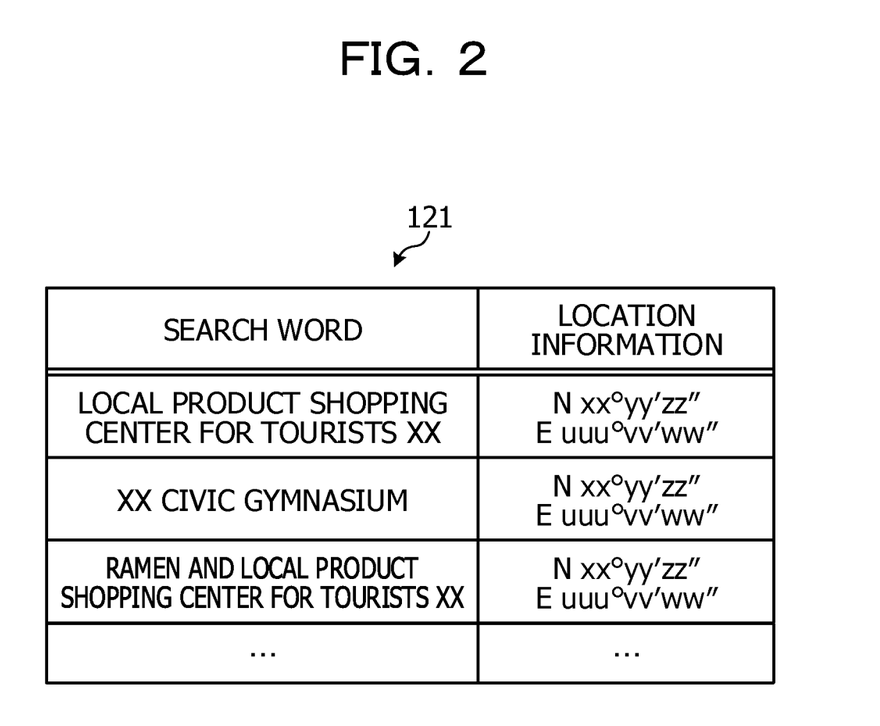
FIG. 2 is a diagram which illustrates an example of location information storage unit.

The location information storage unit 121 stores a search result obtained from the search system which searches location information according to a search word. FIG. 2 is a diagram which illustrates an example of the location information storage unit. As illustrated in FIG. 2, the location information storage unit 121 includes articles such as the "search word" and the "location information", The location information storage unit 121 stores each search word as one record.

The "search word" is a search word which is provided to the search system which searches location information corresponding to a search word (not illustrated), that is, a word corresponding to a proper noun, or information denoting a word of which an image is detected in searching in a term search site, in words corresponding to a non-proper noun. The "location information" is location information which is included in the search result obtained by providing a corresponding search word to the search system (not illustrated). The "location information" is denoted by longitude and latitude, and for example, is based on a geodetic system such as the world geodetic system (WGS 84).

Returning to descriptions in FIG. 1, the control unit 130 is realized when a program stored in a storage device in the inside is executed, using the RAM as a work area, using, for example, a central processing unit (CPU), a micro processing unit (MPU), or the like. The control unit 130 may be realized by an integrated circuit such as an application specific integrated circuit (ASIC), or a field programmable gate array (FPGA), for example. The control unit 130 includes an extracting unit 131, a providing unit 132, an obtaining unit 133, and an output control unit 134, and realizes or executes a function or an operation of information processing which will be described later. An internal configuration of the control unit 130 is not limited to the configuration illustrated in FIG. 1, and may have another configuration when it is a configuration which executes information processing which will be described later. In the following descriptions, there is a case in which a word corresponding to a noun, a word corresponding to a proper noun, and a word corresponding to a non-proper noun are respectively expressed as a noun, a proper noun, and a non-proper noun, simply.

The extracting unit 131, for example, receives a designation of a target web page for obtaining location information based on operation information which is input from the operation unit 112 in the middle of browsing of a web page by a user. For example, when a location information button which is provided in a browser for browsing a web page is pressed, the extracting unit 131 receives a designation of a web page which is being displayed on the browser as the target web page for obtaining location information.

When receiving a designation of the web page, the extracting unit 131 extracts a noun from the web page using a morphological analysis, for example. That is, the extracting unit 131 extracts a word corresponding to a noun from the web page. The noun extracted here is a noun group including a plurality of nouns, and in which a proper noun and a non-proper noun are included. The extracting unit 131 transmits the extracted noun group to a server (not illustrated) which extracts a proper noun, through the communication unit 110 and the network N. The extracting unit 131 may use, for example, a server which extracts a proper noun, that is, an application programming interface (API) which is provided by a server in an external site when extracting a proper noun. The extracting unit 131 receives the proper noun group which is extracted from the server which extracts the proper noun through the network N and the communication unit 110.

The extracting unit 131 specifies each noun in each noun group into any one of a proper noun and a non-proper noun based on: the extracted noun group, and the received noun group. The extracting unit 131 selects one noun from the specified noun group. The extracting unit 131 determines whether or not the selected noun is a proper noun. When the selected noun is a proper noun, the extracting unit 131 stores the selected noun in the location information storage unit 121 as a search word which is a target for searching location information, and outputs thereof to the providing unit 132.

When the selected noun is not a proper noun, the extracting unit 131 searches a predetermined term search sited with respect to the selected noun. As the predetermined term search site, there is a site such as an encyclopedia in which a substantial being is described using an image, such as the Wikipedia (registered trademark), for example. The extracting unit 131 searches the term search site, and extracts an image which is associated with the selected noun. That is, the extracting unit 131 does not extract an image which is common to a web page of each term in the term search site, since the image is not associated with the selected noun. That is, when there is an image in a region in which expository writing for explaining a term in the term search site is described, or a region in which an image associated with a term is disposed in advance, the extracting unit 131 extracts the image as an image associated with the selected noun.

When there is an IMG tag in a region in which expository writing of Hyper Text Markup Language (HTML) is described in a web page of a term, or a region in which an image associated with a term is disposed in advance, the extracting unit 131 extracts an image designated by the IMG tag. A moving image is also included in the image, not only a still image. In other words, the image extracted in the extracting unit 131 is an image which is associated with a page corresponding to a noun which is selected in the predetermined term search site. The extracting unit 131 determines whether or not it is possible to extract an image with respect to the selected noun. When determining that it is possible to extract an image, the extracting unit 131 sets the selected noun to a noun as a substantial noun, stores the selected noun in the location information storage unit 121 as a search word which is a target for searching location information, and outputs the noun to the providing unit 132. That is, the extracting unit 131 determines detecting of an image using a search based on a determination on whether or not it is possible to detect an image associated with a page corresponding to a word corresponding to a non-proper noun in the predetermined term search site.

When determining that it is not possible to extract an image, the extracting unit 131 discards the selected noun by determining the selected noun to be a conceptual term which is not substantial. In addition, the extracting unit 131 determines whether or not there is non-searched noun in the specified noun group. Also in a case in which a determining instruction of non-search is input from the output control unit 134, the extracting unit 131 determines whether or not there is a non-searched noun in the specified noun group. When determining that there is a non-searched noun in the specified noun group, the extracting unit 131 selects one subsequent noun from the specified noun group. In addition, the extracting unit 131 returns to a job of determining whether or not the selected noun is a proper noun. When determining that there is no non-searched noun, the extracting unit 131 ends the location information output processing.

Figure 3:
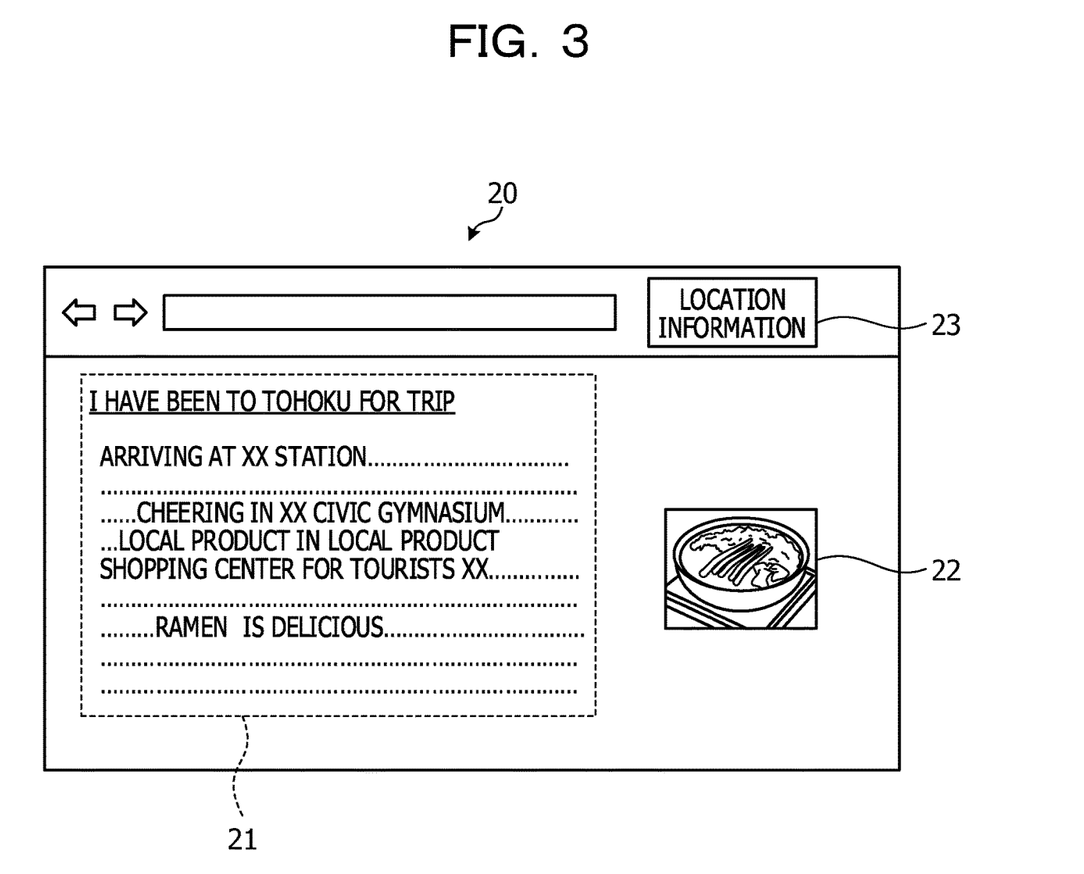
FIG. 3 is a diagram which illustrates an example of a web page.

Here, extracting of a search word in which location information is searched from a target web page will be described with reference to FIG. 3. FIG. 3 is a diagram which illustrates an example of a web page. A display screen illustrated in FIG. 3 is an example of a screen of a browser in which a web page displayed on the display unit 111 is being browsed. For example, a sentence 21 as contents of the web page, and an image 22 are displayed on the display screen 20. In the display screen 20, a location information button 23 is disposed in a tool bar of the browser. The location information button 23 is a button with which a web page which is being displayed is designated as a target web page for obtaining location information, by the extracting unit 131, by being pressed.

In the example illustrated in FIG. 3, when the location information button 23 is pressed, a noun is extracted by executing a morphological analysis with respect to the sentence 21, for example. In the following descriptions, for example, a noun group in which the "xx civic gymnasium", the "local product shopping center for tourist xx", "ramen", and "delicious" are extracted among nouns which are extracted from the sentence 21 will be described as an example.

The extracting unit 131 transmits the "xx civic gymnasium", the "local product shopping center for tourist xx", "ramen", and "delicious" to a server (not illustrated) which extracts a proper noun. The extracting unit 131 receives the "local product shopping center for tourist xx" and "ramen" which are extracted from the server which extracts a proper noun. The extracting unit 131 specifies the "local product shopping center for tourist xx" and "ramen" as proper nouns. The extracting unit 131 specifies the "xx civic gymnasium" and "delicious" as non-proper nouns.

The extracting unit 131 selects one noun from the specified noun group of the "xx civic gymnasium", the "local product shopping center for tourist xx", "ramen", and "delicious". When the "local product shopping center for tourist xx" is selected, and whether or not the selected noun is a proper noun is determined, the extracting unit 131 stores the "local product shopping center for tourist xx" in the location information storage unit 121, and outputs thereof to the providing unit 132, since the "local product shopping center for tourist xx" is a proper noun. Similarly, the extracting unit 131 stores "ramen" in the location information storage unit 121, and outputs thereof to the providing unit 132.

When selecting the "xx civic gymnasium" and determining whether or not the selected noun is a proper noun, the extracting unit 131 searches the predetermined term search site with respect to the "xx civic gymnasium", since the "xx civic gymnasium" is a non-proper noun. The extracting unit 131 searches the term search site, and determines that there is a photograph in a web page which describes the "xx civic gymnasium", and an image associated with the "xx civic gymnasium" is extracted. That is, the "xx civic gymnasium" is not famous as a proper noun, and in the server (not illustrated) which extracts a proper noun, the "xx civic gymnasium" is treated as a combination of the non-proper noun such as "xx", a "citizen", and a "gymnasium". However, since there is a page which describes the "xx civic gymnasium" in the term search site, the "xx civic gymnasium" is a substantial spot. That is, in the server which extracts a proper noun, the extracting unit 131 sets a word which is determined to be a combination of a non-proper noun to a target search word for searching location information as a proper noun when an image is detected in the predetermined term search site. The extracting unit 131 determines that it is possible to extract an image with respect to the "xx civic gymnasium". In addition, the extracting unit 131 stores the "xx civic gymnasium" in the location information storage unit 121, and outputs thereof to the providing unit 132.

When selecting "delicious", and determining whether or not the selected noun is a proper noun, since "delicious" is a non-proper noun, the extracting unit 131 searches the predetermined term search site with respect to "delicious". In the extracting unit 131, there is a case in which there is no web page which explains the word "delicious" as is, as a result of search in the term search site, and there is a web page which illustrates a list of web pages including the word in explaining contents. In this case, the extracting unit 131 determines that it is not possible to extract an image associated with "delicious". The extracting unit 131 determines that it is not possible to extract an image, and discards "delicious" by determining that "delicious" is a conceptual term which is not substantial. In addition, the extracting unit 131 moves to a determination on whether or not there is a noun which is not searched in the specified noun group. That is, as a search word for searching location information, the "local product shopping center for tourists xx", the "xx civic gymnasium", and "ramen" are stored in the location information storage unit 121.

Returning to descriptions in FIG. 1, when a search word is input from the extracting unit 131, the providing unit 132 provides the input search word to the search system (not illustrated) by transmitting thereof through the communication unit 110 and the network N. That is, the providing unit 132 provides a word corresponding to a proper noun, and a word of which an image is detected by a search, even though it is a word corresponding to a non-proper noun, among extracted words, to the search system which searches location information according to a search word. The search system is a system provided with an API for outputting location information when receiving an input of a name such as a building or tourist attractions, for example. As such a search system, for example, there is a system such as the Google (registered trademark) map.

When the searched search word, and a search word as a noun which is selected as the searched search word are input from the obtaining unit 133, the providing unit 132 provides the searched search word and the search word as the noun selected as the searched search word to the search system by transmitting thereof through the communication unit 110 and the network N, so as to execute an AND search. The providing unit 132 updates the search word which is the noun selected by the location information storage unit 121 to an expression of the AND search with the search word as the searched search word and the selected noun. In addition, the providing unit 132 outputs the searched search word and the search word as the selected noun to the obtaining unit 133.

In other words, when there are a plurality of search results, the providing unit 132 provides a word corresponding to a proper noun of which a searched search result is one, or a word of which an image is detected, and a word corresponding to a proper noun with a plurality of search results, or a word of which an image is detected to the search system so as to execute an AND search.

The obtaining unit 133 obtains a search result corresponding to a search word provided by the providing unit 132 from the search system (not illustrated) by receiving thereof through the network N and the communication unit 110. In the search result, for example, location information corresponding to a search word is included. In the search result, there is a case in which plurality of location information corresponding to a search word are included when the search system may not specify location information corresponding to the search word to one. In the following descriptions, a case in which a plurality of search results are present, that is, a case in which there are plurality of location information of a search result corresponding to one search word will be described.

The obtaining unit 133 determines whether or not there are a plurality of search results which are obtained. The obtaining unit 133 stores location information corresponding to a search word in the location information storage unit 121 by causing the location information to associate with the search word when determining that there is no plurality of obtained search result. The obtaining unit 133 outputs the search word stored in the location information storage unit 121, that is, a search word which obtained one piece of location information to the output control unit 134.

When determining that there are a plurality of obtained search results, the obtaining unit 133 obtains a searched search word of which a search result is one with reference to the location information storage unit 121. The obtaining unit 133 outputs the searched search word which is obtained and a search word which is the selected noun to the providing unit 132. When the searched search word and the search word as the noun are input from the providing unit 132, and it is determined that there are a plurality of the obtained search results, the obtaining unit 133 replaces the searched search word, and retry a search. That is, the obtaining unit 133 obtains a searched search word of which a search result is one, and is different from the searched search word which is used in the AND search with reference to the location information storage unit 121, and outputs the searched search word which is obtained, and the search word which is the selected noun to the providing unit 132.

For example, in the example on the third row in FIG. 2, the search word "ramen" as the selected noun is provided to the search system so as to execute an AND search along with the searched search word "local product shopping center for tourists xx", when location information of a plurality of ramen restaurants is obtained as the search result. Then, the obtaining unit 133 stores a search word "ramen and local product shopping center for tourists xx" and the obtained location information in the location information storage unit 121 by causing thereof to be associated with each other, since it is possible to obtain location information of the ramen restaurant in the "local product shopping center for tourists xx".

When there is no searched search word of which a search result is one, the obtaining unit 133 may postpone a search of the search word as the selected noun using the search system. When there are a plurality of search results even when executing the AND search with respect to the search system a predetermined times (for example, five times), the obtaining unit 133 outputs an error which denotes that location information may not be specified, with respect to the search word as the selected noun. In addition, the obtaining unit 133 moves to processing of determining whether or not there is a non-searched noun. When there is the predetermined number of location information of a search result, for example, two or three, the obtaining unit 133 may select one from the location information, and may store the respective location information in the location information storage unit 121 by causing the location information to associate with the search word.

When a search word which obtains one location information from the obtaining unit 133 is input, the output control unit 134 obtains location information corresponding to the search word, with reference to location information storage unit 121. The output control unit 134 transmits the obtained location information to a map information server (not illustrated), for example, through the communication unit 110 and the network N. When receiving the location information, the map information server transmits map information in vicinity of the received location information to the information processing device 100.

When receiving the map information from the map information server, the output control unit 134 displays a map based on the received map information at a part of a web page which a user is browsing, in an overlapping manner, and displays the search word at a position corresponding to location information on the map. That is, the output control unit 134 outputs the location information corresponding to the search result which is obtained, as location information related to the web page, That is, the output control unit 134 outputs the location information corresponding to the search result by plotting on the map. When the location information corresponding to the search result is displayed on the map, the output control unit 134 outputs an instruction of a non-search determination for determining whether or not there is a non-search noun in the specified noun group to the extracting unit 131.

Figure 4:
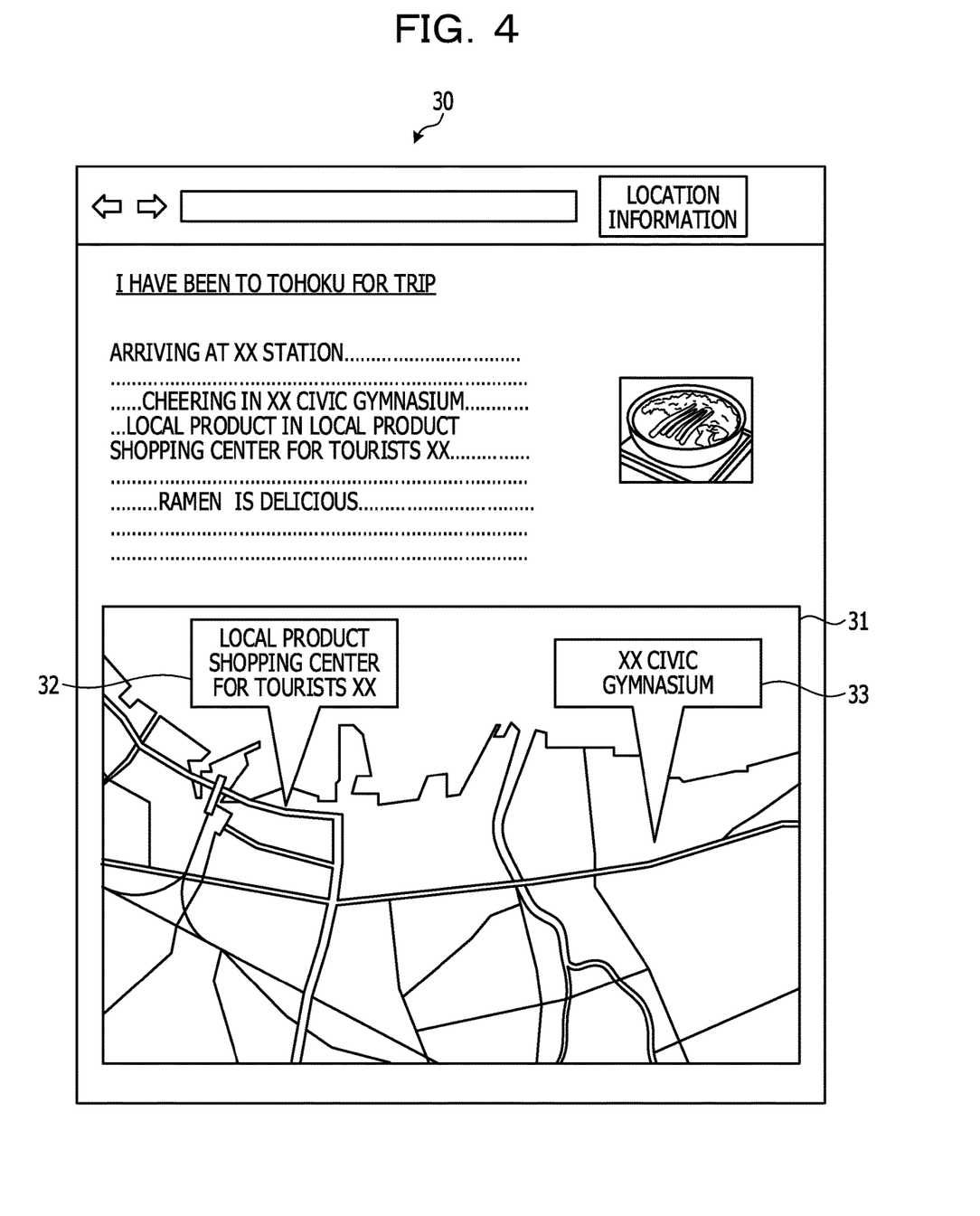
FIG. 4 is a diagram which illustrates an example of a display of location information.

Here, a display of location information related to a web page will be described, using FIG. 4. FIG. 4 is a diagram which illustrates an example of a display of location information. In a display screen 30 illustrated in FIG. 4, a map 31, and search words 32 and 33 on the map 31 are additionally displayed compared to the display screen 20 illustrated in FIG. 3. The search word 32 is displayed at a position of the "local product shopping center for tourists xx" on the map 31, based on location information of the "local product shopping center for tourists xx". Similarly, the search word 33 is displayed at a position of the "xx civic gymnasium" on the map 31 based on location information of the "xx civic gymnasium". In this manner, since the information processing device 100 may provide location information of tourist attractions in a web page which is being browsed by displaying thereof on the map, a user may easily plan a trip.

Figure 5A:
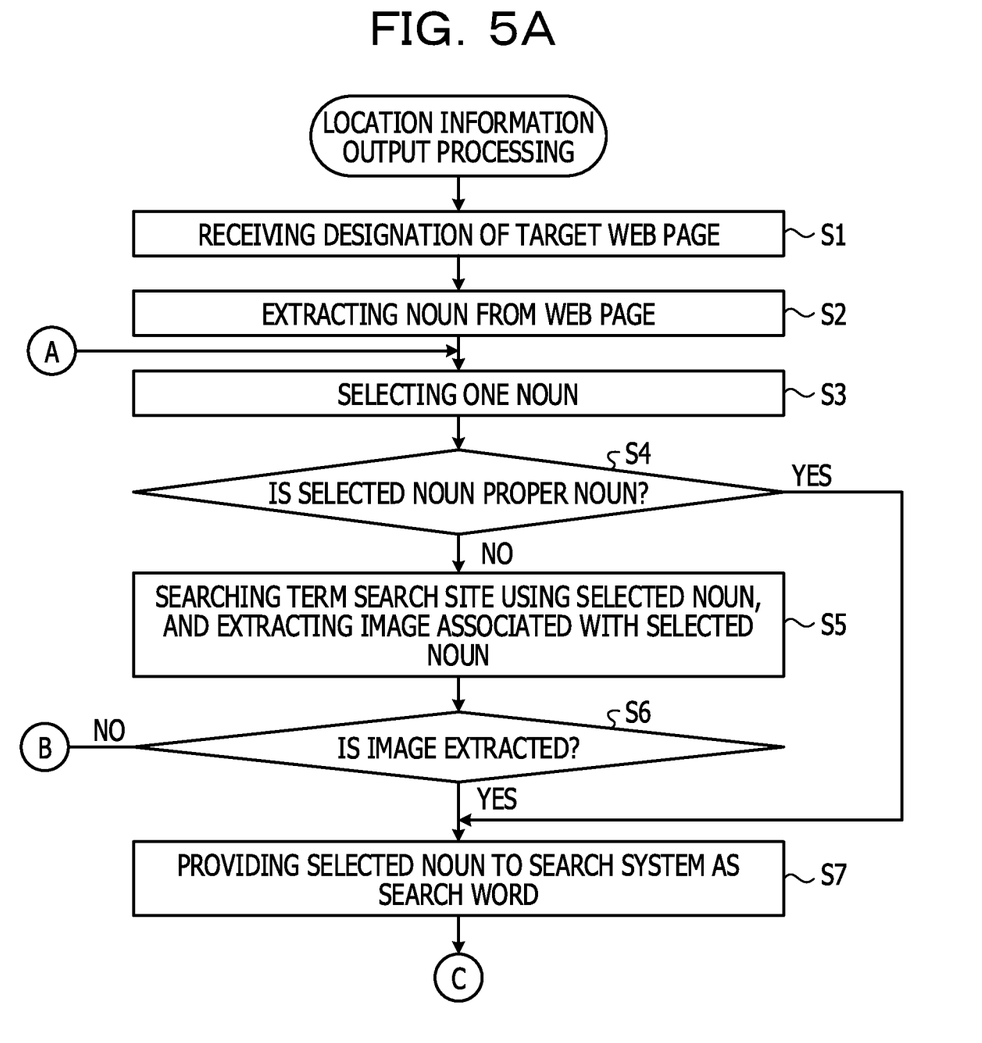
FIGS. 5A and 5B are flowcharts which illustrate an example of location information output processing according to the embodiment.
Figure 5B:
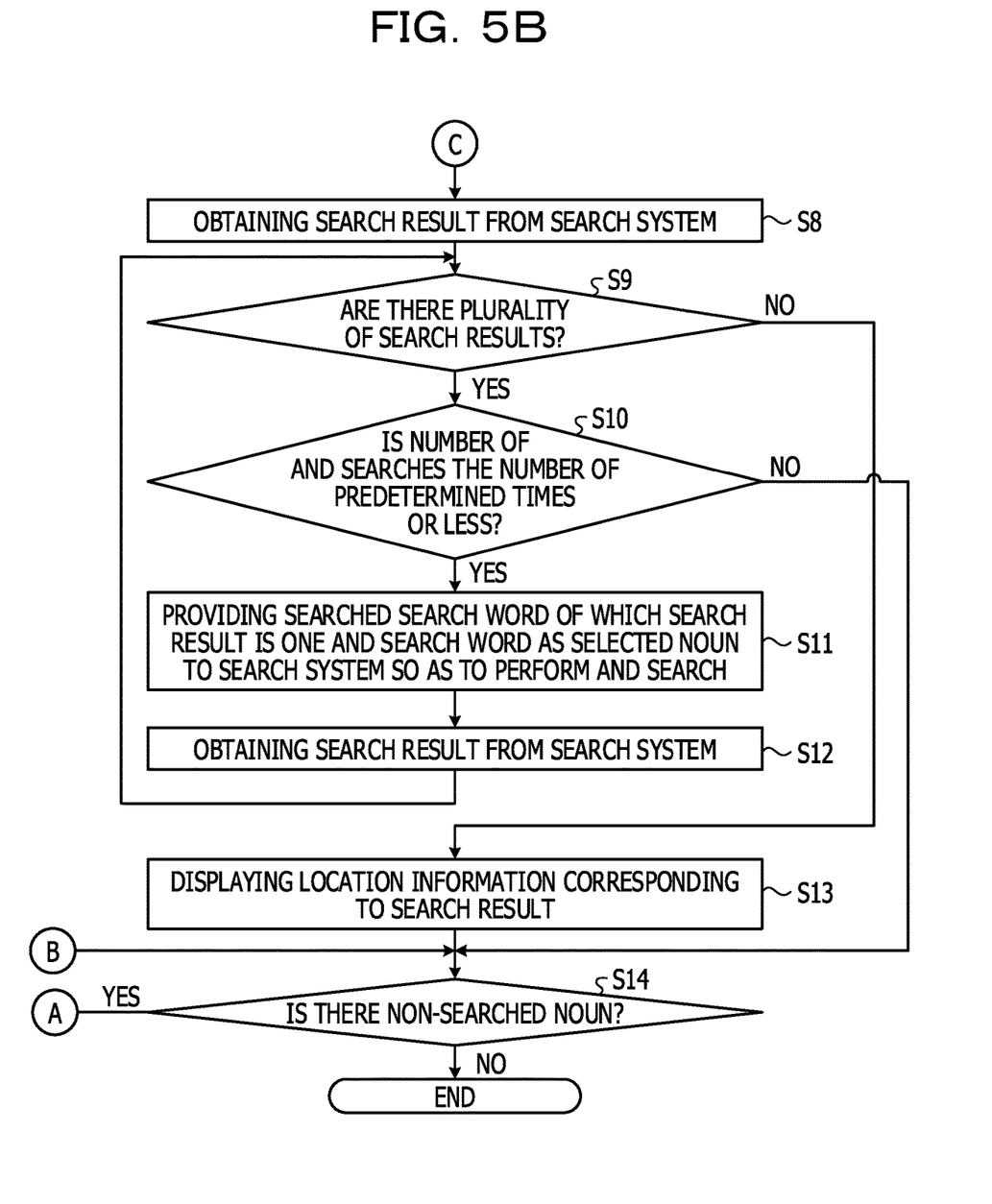

Subsequently, an operation of the information processing device 100 according to the embodiment will be described. FIGS. 5A and 5B are flowcharts which illustrate an example of location information output processing in the embodiment.

The extracting unit 131 of the information processing device 100 executes location information output processing when a location information button is pressed by a user, for example. When the location information button is pressed by a user, the extracting unit 131 receives a designation of a web page (S1). The extracting unit 131 extracts a noun from a web page which is being browsed (S2). The extracting unit 131 transmits an extracted noun group to the server (not illustrated) which extracts a proper noun. The extracting unit 131 receives a proper noun group which is extracted from the server which extracts a proper noun.

The extracting unit 131 specifies each noun in the noun group to any one of a proper noun and a non-proper noun, based on the extracted noun group, and the received proper noun group. The extracting unit 131 selects one noun from the specified noun group (S3). The extracting unit 131 determines whether or not the selected noun is a proper noun (S4). When the selected noun is a proper noun (Yes in S4), the extracting unit 131 stores the selected noun in the location information storage unit 121 as a search word, outputs the noun to the providing unit 132, and proceeds to S7.

When the selected noun is not a proper noun (No in S4), the extracting unit 131 searches the predetermined term search site with respect to the selected noun. The extracting unit 131 extracts an image associated with the selected noun by searching the term search site (S5). The extracting unit 131 determines whether or not an image is extracted with respect to the selected noun (S6), When it is determined that the image may not extracted (No in S6), the extracting unit 131 discard the selected noun by determining the noun to be a conceptual term which is not substantial, and proceeds to S14.

When it is determined that an image is extracted (Yes in S6), the extracting unit 131 stores the selected noun in the location information storage unit 121 as a search word, and output the noun to the providing unit 132. When the search word is input from the extracting unit 131, the providing unit 132 provides the input search word to the search system (not illustrated) by transmitting thereof (S7).

The obtaining unit 133 obtains a search result corresponding to the search word which is provided by the providing unit 132 from the search system (not illustrated) by receiving thereof (S8). The obtaining unit 133 determines whether or not there are a plurality of search results (S9). When determining that there are the plurality of search results which are obtained (Yes in S9), the obtaining unit 133 determines whether or not the number of AND searches is the predetermined number of times or less (S10). When determining that the AND search exceeds the predetermined number of times (No in S10), the obtaining unit 133 discards the current search word by determining that it is not possible to specify location information, and proceeds to S14.

When determining that the AND search is the predetermined number of times or less (Yes in S10), the obtaining unit 133 obtains the searched search word of which the search result is one, with reference to the location information storage unit 121. The obtaining unit 133 outputs the obtained searched search word and the search word as the selected search noun to the providing unit 132. When the searched search word and the search word as the selected noun are input from the obtaining unit 133, the providing unit 132 provides the searched search word of which the search result is one, and the search word as the selected noun to the search system by transmitting thereof so as to execute the AND search (S11). The providing unit 132 updates the search word as the selected noun of the location information storage unit 121 to an expression of the AND search of the searched search word and the search word as the selected noun. In addition, the providing unit 132 outputs the searched search word and the search word as the selected noun to the obtaining unit 133, The obtaining unit 133 obtains a search result corresponding to the search word which is provided by the providing unit 132 from the search system (not illustrated) by receiving thereof (S12), and returns to S9.

Returning to descriptions of S9, when it is determined that the obtained search result are not plurality of results (No in S9), the obtaining unit 133 stores location information corresponding to the search word in the location information storage unit 121 by causing the location information to be associated with the search word. The obtaining unit 133 outputs the search word stored in the location information storage unit 121, that is, the search word which obtained one location information to the output control unit 134.

When the search word which obtained one location information from the obtaining unit 133 is input, the output control unit 134 obtains location information corresponding to the search word with reference to the location information storage unit 121. The output control unit 134 transmits the obtained location information to the map information server (not illustrated), for example. When receiving map information from the map information server, the output control unit 134 displays the location information corresponding to the obtained search result on the map (S13). When the location information corresponding to the obtained search result is displayed on the map, the output control unit 134 outputs a determining instruction of non-search to the extracting unit 131.

When it is No in S6 and S10, or when the determining instruction of non-search is input from the output control unit 134, the extracting unit 131 determines whether or not there is non-searched noun in the specified noun group (S14). When it is determined that there is non-searched noun (Yes in S14), the extracting unit 131 returns to S3. When it is determined that there is no non-searched noun (No in S14), the extracting unit 131 ends the location information output processing. In this manner, the information processing device 100 may provide location information. That is, the information processing device 100 may provide location information of tourist attractions in a web page which a user is browsing.

In this manner, the information processing device 100 extracts a word corresponding to a noun from a web page. The information processing device 100 provides a word corresponding to a proper noun, and a word of which an image is detected using a search, even when it is a word corresponding to a non-proper noun, among the extracted words, to the search system which searches location information according to a search word. The information processing device 100 obtains a search result corresponding to a provision from the search system. The information processing device 100 outputs location information corresponding to the obtained search result as location information associated with a web page. As a result, the information processing device 100 may provide location information.

In the information processing device 100, detecting of an image using a search is determined by detecting an image which is associated with a page corresponding to a word corresponding to a non-proper noun in a predetermined term search site. As a result, the information processing device 100 may provide location information of a spot of which an image is detected in the predetermined term search site, even when it is a non-proper noun.

When there are a plurality of search results, the information processing device 100 provides a word corresponding to a proper noun of which a searched search result is one, a word of which an image is detected, a word corresponding to a proper noun with a plurality of search results, or a word of which an image is detected to the search system so as to execute the AND search. That is, the information processing device 100 outputs location information corresponding to the search result obtained by executing adding processing, in the search result, as location information related to a web page. As a result, the information processing device 100 may provide a search word there are plurality of location information, that is, location information which further narrow down the spot.

The information processing device 100 outputs location information corresponding to the search result by plotting thereof on the map. As a result, the information processing device 100 may provide the location information of the spot so as to be easily understood.

In the above described embodiment, a blog was described as an example of a web page; however, it is not limited to this. For example, it may be a configuration in which a location information button is embedded in a home page of a tourist association in a certain district, location information output processing is executed in an information processing device which is different from a terminal device which a user uses, when the location information button is pressed, and an execution result is transmitted to the terminal device.

In the above described embodiment, a case in which matters regarding location information, for example, an address is not described in a web page which a user is browsing, and a page corresponding to a noun selected in a predetermined search site is assumed; however, it is not limited to this. For example, when an address is described in the pages, it may be configured so that location information, for example, the longitude and latitude is obtained as a search result, by providing the address to a search system.

In the above described embodiment, a Japanese web page and site are used as the predetermined term search site; however, it is not limited to this. For example, it may be another language such as English.

Each constituent element of each unit which is illustrated is not necessarily configured so as to be physically the same as that in the figure. That is, a specific form in distribution and combination of each unit is not limited to the illustration, and it is possible to configure all, or a part of unit to be distributed or combined in an arbitrary unit, functionally or physically, according to various loads, a use situation, or the like. For example, the providing unit 132 and the obtaining unit 133 may be combined. Illustrated each processing is not limited to the above described order, may be simultaneously executed in a range in which processing contents are not contradictory, and may be executed by changing order.

In addition, all, or a part of various processing functions which are executed in each device may be executed in a CPU (or, microcomputer such as MPU, Micro Controller Unit (MCU)). It is needless to say that all, or an arbitrary part of the various processing functions may be executed in a program which is analysis-executed in the CPU (or, microcomputer such as MPU or MCU), or in hardware using wired logic.

Figure 6:
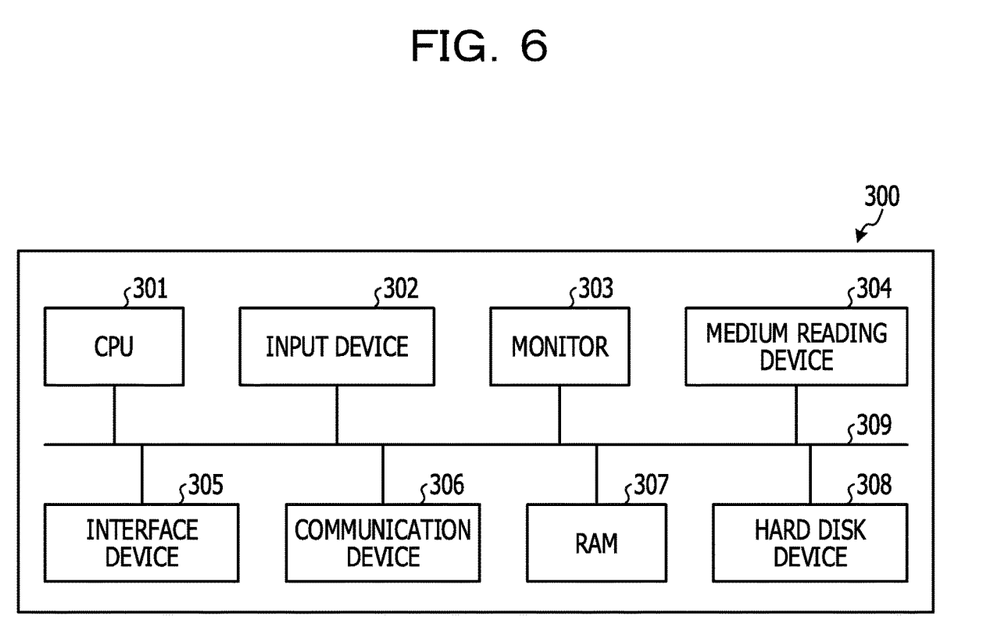
FIG. 6 is a diagram which illustrates an example of a computer which executes a location information output program.

Meanwhile, various processing which are described in the above described embodiment may be executed by executing a program which is prepared in advance in a computer. Therefore, hereinafter, an example of a computer which executes a program with the same function as that in the above described embodiment will be described. FIG. 6 is a diagram which illustrates an example of a computer which executes a location information output program.

As illustrated in FIG. 6, a computer 300 includes a CPU 301 which executes various arithmetic processing, an input device 302 which receives a data input, and a monitor 303. The computer 300 includes a medium reading device 304 which reads a program, or the like, from a recording medium, an interface device 305 for being connected with various devices, and a communication device 306 for being connected with another information processing device or the like, in a wired or a wireless manner. The computer 300 includes a RAM 307 which temporarily stores various information, and a hard disk device 308. Each device 301 to 308 is connected to a bus 309.

A location information output program which includes the same function as that of the each processing unit of the extracting unit 131, the providing unit 132, the obtaining unit 133 and the output control unit 134 which are illustrated in FIG. 1 is stored in the hard disk device 308. A location information storage unit 121, and various data for executing the location information output program are stored in the hard disk device 308. The input device 302 receives an input of various information such as operation information from a user of the computer 300. The monitor 303 displays various screens such as a display screen with respect to the user of the computer 300. A printing apparatus, or the like, for example, is connected to the interface device 305. The communication device 306 is connected to the network N which has the same function as that of the communication unit 110 which is illustrated in FIG. 1, for example, and exchanges various information with a web server 200, or the like.

The CPU 301 reads each program which is stored in the hard disk device 308, and executes various processing by developing and executing the program in the RAM 307. These programs may cause the computer 300 to function as the extracting unit 131, the providing unit 132, the obtaining unit 133, and the output control unit 134 which are illustrated in FIG. 1.

The above described location information output program is not necessarily stored in the hard disk device 308. For example, a program which is stored in a recording medium which the computer 300 may read may be read and executed by the computer 300. To the recording medium which the computer 300 may read, for example, a portable recording medium such as a CD-ROM, a DVD, or a Universal Serial Bus (USB) memory, a semiconductor memory such as a flash memory, a hard disk drive, or the like, correspond. It may be a configuration in which the location information output program is stored in a device which is connected to a public line, the Internet, a LAN, or the like, and the computer 300 executes the location information output program by reading the program from these.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A location information output method executed by a processor included in an information processing device provided with a display device, the method comprising:
    extracting a plurality of nouns from a target web page displayed on a screen of the display device;
    determining, for each of the plurality of nouns, whether a selected noun is a proper noun;
    when it is determined that the selected noun is the proper noun:
        transmitting the selected noun to a search system as a search word for searching location information,
        receiving a search result of the search word which is obtained according to the transmitting from the search system, and
        outputting the location information included in the received search result from the display device as location information related to the target web page; and
    when it is determined that the selected noun is not the proper noun:
        searching a term search site using the selected noun when it is determined that the selected noun is not the proper noun,
        determining whether an image corresponding to the selected noun is extracted from a web page which describes the selected noun searched by the term search site,
        transmitting the selected noun to the search system as the search word for searching the location information when it is determined that the image is extracted from the web page,
        receiving a search result of the search word which is obtained according to the transmitting from the search system, and
        outputting the location information included in the received search result from the display device as location information related to the target web page.

2. The location information output method according to claim 1,
    wherein the image is an image which is associated with a page corresponding to a word corresponding to the non-proper noun in a predetermined term search site.

3. The location information output method according to claim 1,
    wherein the outputting includes outputting location information corresponding to a search result which is obtained by additional processing, in the search result, as location information related to the target web page.

4. The location information output method according to claim 1,
    wherein the outputting includes outputting location information corresponding to the search result by plotting the result on a map.

5. The location information output method according to claim 1, further comprising:
    discarding a word corresponding to the non-proper noun, and a word of which an image is not detected by the search, among the extracted plurality of words.

6. The location information output method according to claim 1, further comprising:
    determining whether there are a plurality of the received search results;
    determining whether the number of AND searches is a predetermined number of times or less, when it is determined that there are the plurality of received search results; and
    discarding the search word corresponding to the search result, when it is determined that the number of AND searches exceeds the predetermined number of times.

7. An information processing device comprising:
    a display device; and
    a processor coupled to the display device, and configured to:
        extract a plurality of nouns from a target web page displayed on a screen of the display device,
        determine, for each of the plurality of nouns, whether a selected noun is a proper noun,
        when it is determined that the selected noun is the proper noun:
            transmit the selected noun to a search system as a search word for searching location information,
            receive a search result which is obtained according to the transmitting from the search system, and
            output the location information included in the received search result from the display device as location information related to the web page, and
        when it is determined that the selected noun is not the proper noun:

search a term search site using the selected noun when it is determined that the selected noun is not the proper noun, determine whether an image corresponding to the selected noun is extracted from a web page which describes the selected noun searched by the term search site, transmit the selected noun to the search system as the search word for searching the location information when it is determined that the image is extracted from the web page, receive a search result of the search word which is obtained according to the transmitting from the search system, and output the location information included in the received search result from the display device as location information related to the web page.

8. The information processing device according to claim 7, wherein the image is an image which is associated with a page corresponding to a word corresponding to the non-proper noun in a predetermined term search site.

9. The information processing device according to claim 7, wherein the processor is configured to output location information corresponding to a search result which is obtained by additional processing, in the search result, as location information related to the target web page.

10. The information processing device according to claim 7, wherein the processor is configured to output location information corresponding to the search result by plotting the result on a map.

11. The information processing device according to claim 7, wherein the processor is configured to discard a word corresponding to the non-proper noun, and a word of which an image is not detected by the search, among the extracted plurality of words.

12. The information processing device according to claim 7, wherein the processor is configured to:

determine whether there are a plurality of the received search results;

determine whether the number of AND searches is a predetermined number of times or less, when it is determined that there are the plurality of received search results; and discard the search word corresponding to the search result, when it is determined that the number of AND searches exceeds the predetermined number of times.

13. A non-transitory computer-readable recording medium storing a program that causes a processor included in an information processing device provided with a display device to execute a process, the process comprising:

extracting a plurality of nouns from a target web page displayed on a screen of the display device;

determining, for each of the plurality of nouns, whether a selected noun is a proper noun;

when it is determined that the selected noun is the proper noun:

transmitting the selected noun to a search system as a search word for searching location information, receiving a search result of the search word which is obtained according to the transmitting from the search system, and outputting the location information included in the received search result from the display device as location information related to the target web page; and when it is determined that the selected noun is not the proper noun:

searching a term search site using the selected noun when it is determined that the selected noun is not the proper noun, determining whether an image corresponding to the selected noun is extracted from a web page which describes the selected noun searched by the term search site, transmitting the selected noun to the search system as the search word for searching the location information when it is determined that the image is extracted from the web page, receiving a search result of the search word which is obtained according to the transmitting from the search system, and outputting the location information included in the received search result from the display device as location information related to the target web page.

* * * * *